INVENTOR.
ROBERT L. McILVAINE
BY Mason, Kolehmainen,
Rathburn & Wyss.
ATTORNEYS

Dec. 6, 1966 R. L. McILVAINE 3,289,398
ENTRAINMENT SEPARATOR

Filed Sept. 18, 1963 4 Sheets-Sheet 3

INVENTOR.
ROBERT L. McILVAINE
BY Mason, Kolehmainen,
Rathburn & Wyss
ATTORNEYS

Dec. 6, 1966 R. L. McILVAINE 3,289,398
ENTRAINMENT SEPARATOR
Filed Sept. 18, 1963 4 Sheets-Sheet 4

INVENTOR.
ROBERT L. McILVAINE
BY Mason, Kolehmainen,
Rathburn & Wyss.
ATTORNEYS

United States Patent Office 3,289,398
Patented Dec. 6, 1966

3,289,398
ENTRAINMENT SEPARATOR
Robert L. McIlvaine, Winnetka, Ill., assignor to National Dust Collector Corporation, Chicago, Ill., a corporation of Illinois
Filed Sept. 18, 1963, Ser. No. 309,789
1 Claim. (Cl. 55—440)

This invention relates generally to industrial dust collectors and more particularly to apparatus for removing moisture which remains entrained in the stream of cleaned air flowing in the collector after most of the dust particles have been removed.

In a dust collector of the type utilizing a liquid such as water for removing dust particles from air or other gas, the dust-laden or dirty air entering the collector is invested with a quantity of entrained moisture for use in entrapping the dust particles. The stream of air with the entrained moisture therein is passed through a filter bed where the dust particles are entrapped in the liquid and removed therefrom as is more fully described in U.S. Patent No. 2,691,423. The air stream leaving the filter bed, however, still contains a quantity of moisture which it is desirable to remove so that the cleaned air leaving the filter apparatus is as dry as possible. Previous collectors of this general type have employed means such as filters and the like placed in the air stream after the main filter bed for removing moisture from the air stream. These filters have the disadvantage of being hard to clean, plugging up and having relatively high pressure losses. Other means such as horizontal vanes have also been utilized but have the disadvantage that the moisture collected on the horizontal vanes is hindered from flowing off the vanes by the air stream itself which flows across the vanes, and the moisture thus collected is picked up again by the air stream.

Accordingly, it is an object of the present invention to provide a new and improved dust collector of the type utilizing a liquid for entrapping dust particles in which means are provided which effectively remove moisture from the air leaving the main filter bed and return this collected moisture to another part of the filter apparatus for reuse.

It is another object of this invention to provide a new and improved moisture separator of the type described having vanes designed so that collected moisture is able to run down them without being opposed and picked up again by the flow of air.

It is still another object of this invention to provide a new and improved moisture separator of the type described in which collected moisture is able to return to the filter apparatus through a passageway which is not subjected to the air flow.

It is a further object of this invention to provide a new and improved moisture separator of the type described having a plurality of vanes which can be easily removed individually for cleaning and the like.

Yet another object of the present invention is the provision of a new and improved moisture separator for a dust collector which has a low resistance to the air flow, which is simple and economical in construction and which will not clog or plug up readily.

These and further objects and advantages of the present invention will appear from the following detailed description, taken with the accompanying drawings, in which.

Figure 1:
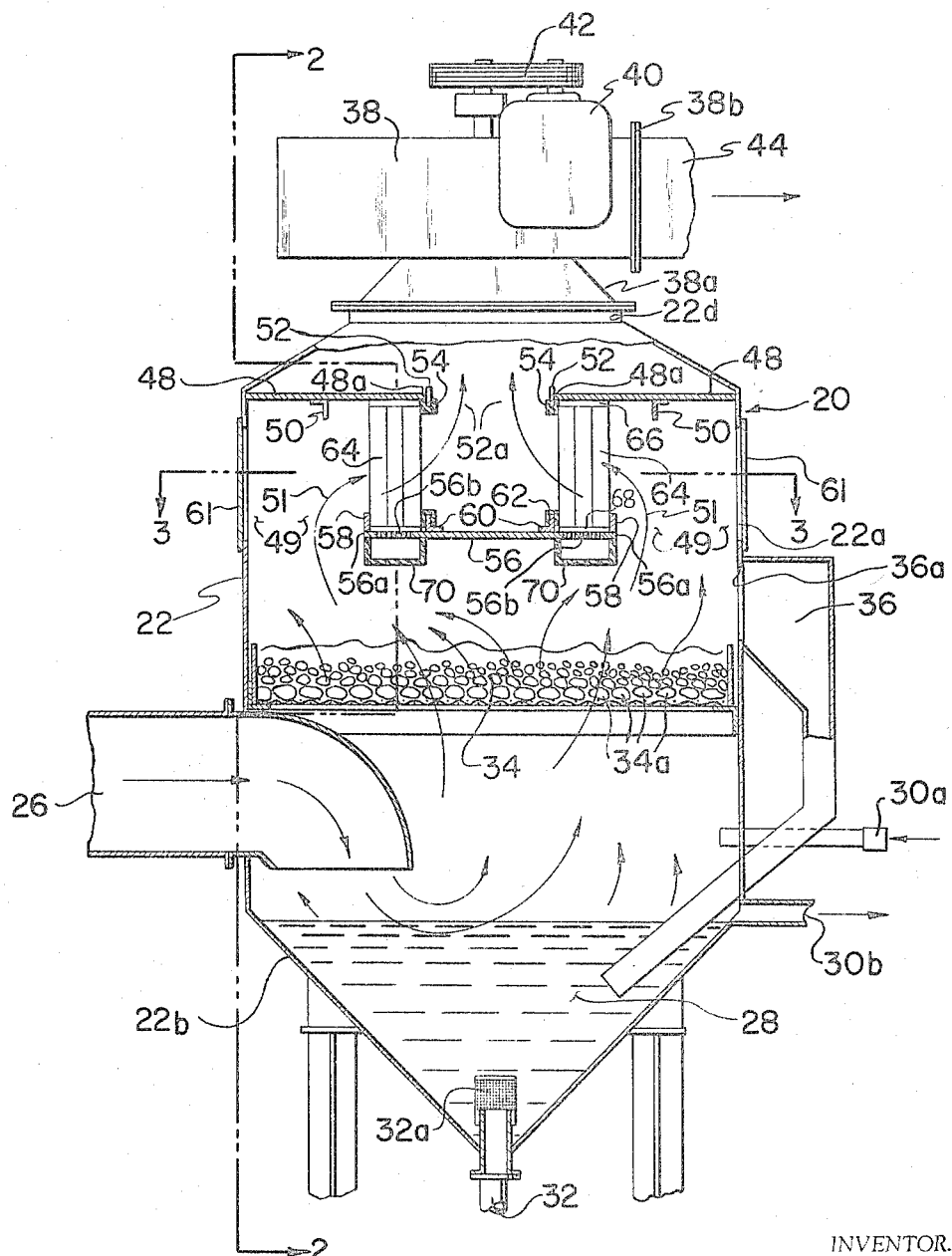
FIG. 1 is a side elevational view, partly in cross section, of a dust collector constructed in accordance with the present invention.

The foregoing and other objects and advantages of the present invention are accomplished by the provision of a new and improved dust collector for removing dust particles from air by entrapment of the particles in a liquid comprising a housing having a liquid sump in the lower portion thereof in which a liquid level is maintained. Air inlet means are provided for directing a flow of dust-laden air into the housing adjacent the liquid level to entrain liquid in the air flow. A main filter bed is provided in the housing above the liquid level so that the dust-laden air with moisture entrained therein passes upwardly therethrough and the dust particles therein are entrapped in the liquid and separated from the air flow. Air outlet means positioned adjacent the upper end of the housing are provided for directing the flow of cleansed air from the filter bed out of the housing for use as desired. Between the filter bed and the outlet means there is provided a new and improved moisture separating means which removes and collects moisture in the air flow which remains after the air passes through the filter bed. The separator means includes a plurality of vertically extending vanes which are positioned in spaced apart parallel relation to allow the air to flow therebetween. Each of the vanes is provided with a plurality of surfaces positioned angularly in relation to one another for changing the direction of the air flow and separating the moisture therefrom. Moisture which is separated on these surfaces can flow down the vanes generally normal to the air flow and is collected therebelow for delivery to the filter bed or sump. The vanes are arranged and secured within the housing in a manner so that they may be rapidly and easily removed individually for cleaning when necessary.

More specifically, having reference to the drawings, there is illustrated a dust collector 20 for removing dust and dirt from a stream of air or other gas. The dust collector includes a housing 22 having a cylindrical side wall 22a, a bottom conical or sump portion 22b and a top conical or hood portion 22c. The housing 22 is supported by a plurality of legs 24 secured to the bottom conical portion 22b.

Dust-laden air which is to be cleaned, enters the dust collector through an inlet 26 in the side wall 22a and is directed along the upper surface of water or other liquid which is maintained at a given level in the sump or conical portion 22b. In order to maintain a desired constant level of liquid in the sump there is provided a float controlled liquid inlet line 30a and an overflow drain line 30b. In order to completely drain the sump for cleaning and the like, there is provided a drain 32 having a drain screen 32a positioned at the bottom of the sump 22b.

As the dust-laden air moves along the upper surface of the liquid in the sump, a quantity of moisture is entrained in the air flow. The dust-laden air with the moisture therein then moves upwardly through a drain filter bed 34 which is positioned above the liquid level in the sump.

The filter bed 34 is constructed in accordance with the aforementioned U.S. Patent No. 2,691,423 and contains a plurality of spheroids 34a. The dust particles in the air stream cling to the moisture droplets in the stream and when the air-dust-water mixture impinges on the spheroids 34a they become wetted so that the wetted dust particles cling thereto. Since devious paths are provided between the various spheroids, the inertia of the unwetted dust particles will cause them to impinge upon the spheroids and cling thereto. However, the upwardly traveling moisture droplets continually wash off and carry upwardly the wetted dust to form a turbulent area of dirty water above the filter bed 34. In this manner almost all of the dust particles will be wetted and will remain behind in the dirty water above the filter bed while the now cleansed air will continue to travel upwardly.

In order to drain off the accumulating dirty water above the filter bed 34 yet still maintain a level of turbulent water thereabove, there is provided a conduit 36 which is connected to an opening 36a in the side wall 22a of the housing. The bottom edge of the opening 36a forms a dam for maintaining the turbulent dirty water at the desired level. The lower end of conduit directs the sludge and accumulated dust particles to the sump 22b where it settles to the bottom and is removed from time to time.

In order to move air through the dust collector for cleaning, there is provided a fan 38 having an inlet 38a adapted to lie on top of an outlet opening 22d formed in the upper conical top portion 22c of the housing 22. The fan 38 is provided with an outlet 38b which is adapted for connection to a distribution duct 44 to distribute the cleaned air as desired. The fan 38 is driven by an electric motor 40 and belt drive assembly 42.

Figure 2:
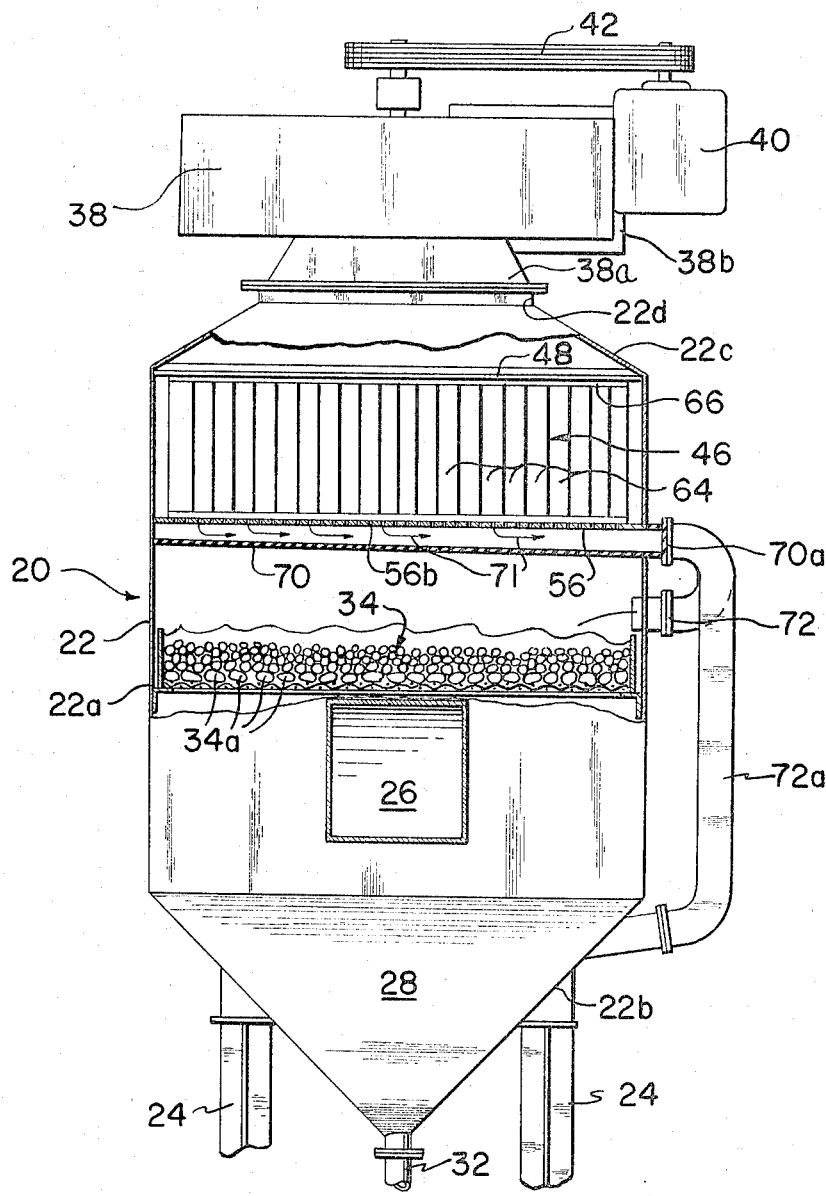
FIG. 2 is an elevational view, partly in cross section, of the dust collector of FIG. 1, taken substantially along lines 2—2.

The stream of air after leaving the filter bed 34 still contains a quantity of moisture entrained therein. In order to effectively remove this moisture before the air stream leaves the dust collector 20 there is provided, in accordance with the present invention, moisture separating assembly indicated generally by the reference numeral 46. As can be seen in FIGS. 1 and 2, the moisture separator assembly is positioned in the housing 22 above the main filter bed 34 below the outlet 22d in the housing.

The assembly 46 includes a pair of top plates 48 joined along their edges to the cylindrical wall 22 and having opposed parallel inner straight edges 48a. Angles 50 are provided to help support the plates 48 between their inner edges 48a and the circular extremities. Flanges 52 having U-shaped rubber bumpers 54 on the lower edges thereof are provided along the edges 48a forming an opening 52a thru which the air moves upwardly to the outlet 22d.

Figure 3:
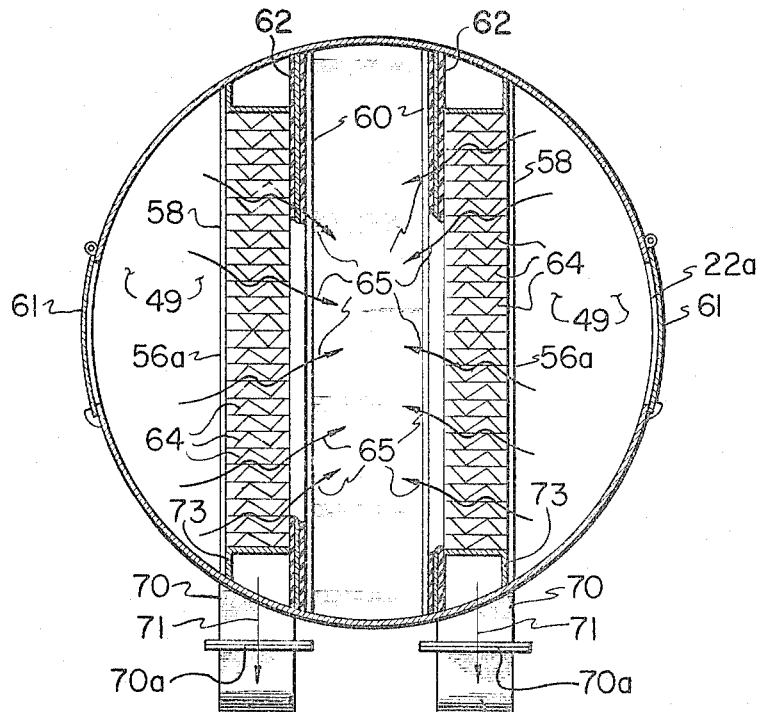
FIG. 3 is a cross-sectional view of the collector of FIG. 1 taken substantially along the line 3—3 of FIG. 1.

Directly below the plates 48 and outwardly adjacent the rubber bumpers 54 there are provided a pair of parallel banks of vertically extending vanes 64. As can be seen in FIG. 3, the vanes 64 are Z-shaped in cross-section and are spaced in parallel relation to one another for allowing air to flow therebetween in the direction of the arrows 65. The vanes 64 are supported on a bottom plate 56 which extends across the central portion of the housing 22 and is provided with a pair of outer edges 56a which are parallel to and spaced outwardly from the edges 48a of the top plate 48. Air spaces 49 are provided between the edges 56a and the outer wall 22a of the housing so that the air may flow upwardly from the filter bed 34, in the general direction shown by the arrows 51 (FIG. 1).

Figure 5:
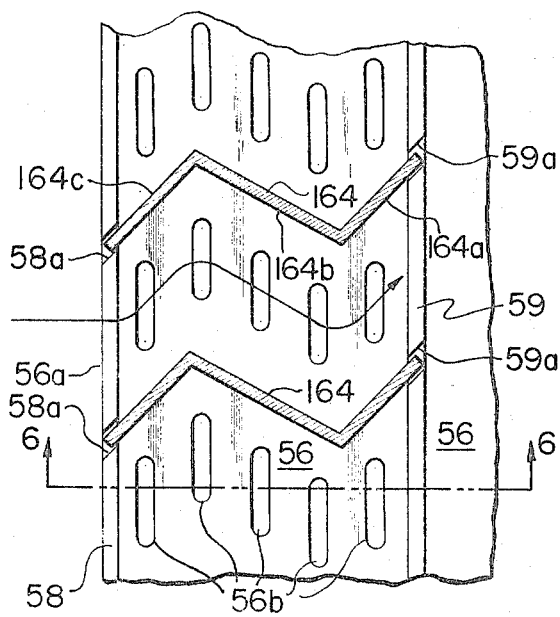
FIG. 5 is a fragmentary cross-sectional view of another embodiment of vanes used in the collector of FIG. 1, taken substantially along line 5—5 of FIG. 6.
Figure 6:
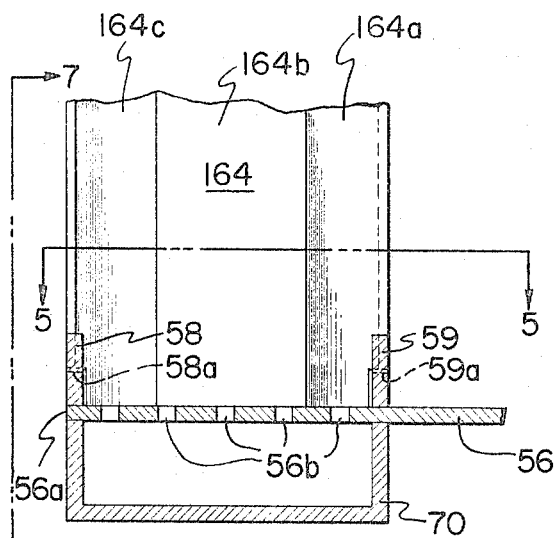
FIG. 6 is a cross-sectional oval view taken along a line 6—6 of FIG. 5.
Figure 7:
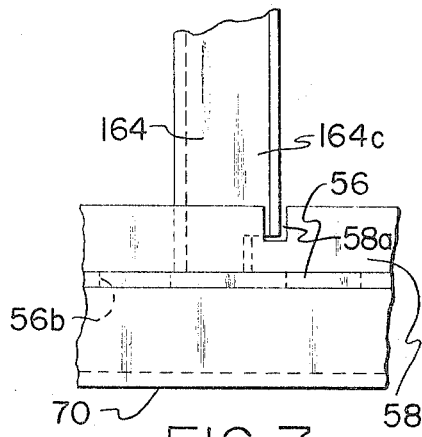
FIG. 7 is a side view of the apparatus of FIG. 5 taken along the line 7—7 of FIG. 5.

The bottom plate 56 is provided with a plurality of openings 56b which are arranged to lie directly beneath the parallel banks of vanes 64 to provide for drainage of the moisture collected thereon. Beneath the openings 56b a pair of collecting channels 70 are provided to collect the moisture running through the openings 56b. The channels 70 have a sloping bottom (FIG. 2) so that the moisture collected therein will flow toward an outer end 70a thereof as indicated by the arrows 71. Moisture thus collected in the channels 70 is directed either through a short conduit 72 back into the housing just above the filter bed 34 or through a longer conduit 72a into the sump 22b. The channels 70 can be constructed of rubber as shown in FIGS. 1, 2 and 3 to avoid rusting and corrosion by the water or can be constructed of a corrosion resistant metal as shown in FIGS. 5, 6 and 7.

Along the edges 56a of the bottom plate 56, there are provided upwardly extending vane retaining flanges 58 which aid in securing the vanes 64 in place. Referring to FIG. 1, there are provided adjacent the inner corners of the banks of vanes a pair of parallel angles 60 which are parallel to the retaining flanges 58. The angles 60 additionally serve as stiffeners for the plate 56 and are provided with U-shaped rubber bumpers 62 along their upstanding legs. The inner edges of the vanes 64 are in contact with the upper bumpers 54 and the lower bumpers 62 and are secured in this position by the flanges 58. When it is desired to remove a vane 64 from either of the banks of vanes, the vane is raised to clear the flange 58 and then removed horizontally outward. To facilitate the removal of the vanes 64 the housing 22 is provided with access doors 61 which when closed are tightly sealed to prevent leakage.

Figure 4:
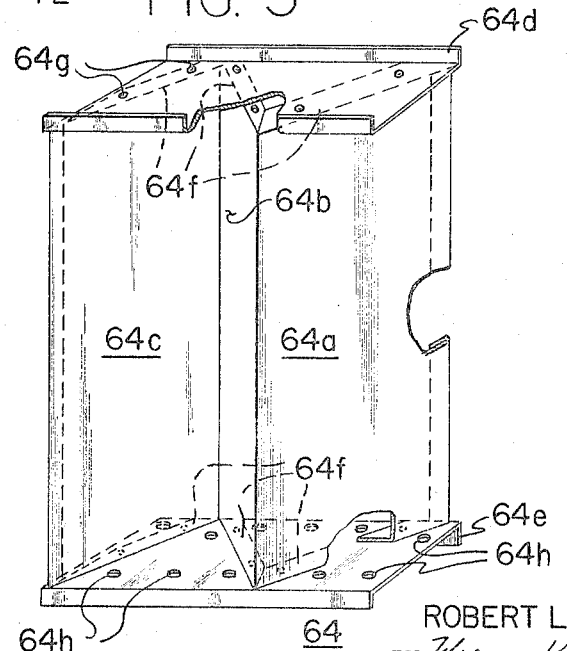
FIG. 4 is a perspective view of one embodiment of a vane used in the collector of FIG. 1.

Referring to FIG. 3, each bank of upstanding vanes 64 is provided with upstanding angles 73 at the ends thereof and the individual vanes are positioned therebetween. FIG. 4 illustrates one embodiment of a vane 64 having a generally Z-shaped cross-section with surfaces 64a, 64b and 64c thereof positioned angularly with respect to each other so that the air flow between adjacent vanes as indicated by the arrows 65 of FIG. 3 will abruptly change direction. When this happens, particles of moisture in the air flow because of their inertia will impinge and collect on the vanes. The moisture so collected will run vertically down the vanes and no appreciable amount will be re-entrained in the flow because of the vertical disposition of the vanes with respect to the generally horizontal flow of the air.

The vane 64 of FIG. 4 is constructed of a thin corrosion resistant metal such as stainless steel or aluminum and is provided with an upper channel shaped spacer 64d and a lower channel shaped spacer 64e. The surfaces 64a, b and c of the vanes are provided with end flanges 64f which are secured to the end spacers 64d and 64e by spot welding or rivets 64g. The lower spacer 64e is provided with a plurality of drain holes 64h so that water collected by the vanes will drain freely into the channels 70 through the opening 56b in the plate 56. The spacers 64d and 64e of adjacent vanes abut one another when the vanes are arranged in the banks as shown and the width of these spacers is dimensioned to provide the proper spacing between the surfaces 64a, b and c of adjacent vanes for the best moisture separation.

It has been found that vanes of the vertically extending type as described arranged in spaced parallel relation and having surfaces thereof extending angularly to one another are very effective in removing moisture from an air flow therebetween because the moisture as it impinges on the surface flows down the vane free from obstruction and is not picked up again by the generally horizontally moving air stream. Moreover, a separator with vanes of this type offers little resistance to the air flow with a resultant small pressure loss therethrough in addition to providing for the easy cleaning and removal or replacement of the individual vanes as needed. Furthermore, separators having vanes of this type seldom plug up or become clogged and are relatively maintenance free in comparison to other type of moisture separators. Dust particles in the air flow are wetted by and cling to the separated moisture on the vanes, thus further cleaning the air flow.

FIGS. 5, 6 and 7 illustrate another embodiment of vane 164 having moisture collecting surfaces 164a, b and c as before described. The surfaces 164a and 164c are provided with notches at their lower corners so that the vanes may be secured in a vertical position as shown in notches 58a provided in the retaining flanges 58 and notches 59a provided in an inner retaining flange 59 positioned parallel. With this arrangement no end spacers are required on the vanes 164 since the spacing between the vanes is controlled by the spacing of the notches 58a and 59a. The vanes 164 are removable individually as desired by lifting them upward until the lower ends thereof clear the retaining flanges 58 and then moving them outwardly.

It is to be understood that while the vanes 164 and 64 have been shown and described as having Z-shaped horizontal cross-sections that vertically extending vanes with different cross-sections having surfaces extending angularly with respect to one another to impinge moisture particles thereon may be used. Also, the spacing between and the dimensions of the vanes may be varied or adjusted to the conditions of flow velocity, and liquid surface tension and viscosity to obtain the best results.

Although the present invention has been described with reference to the illustrated embodiments, it should be understood that many other modifications and embodiments can be devised by those skilled in the art that will fall within the true spirit and scope of the principles of this invention.

What is claimed as new and desired to be secured by Letters Patent of the United States is:

Apparatus for separating liquid contaminants from a gaseous fluid stream, said apparatus comprising: a row of individually replaceable, spaced apart vertically upstanding separator vanes, said row extending transversely across the path of said fluid stream, each of said vanes including a plurality of vertical surfaces disposed in angular relationship with one another and the path of said fluid stream, horizontal flanges projecting from the top and bottom edges of said vertical surfaces, an upper channel shaped spacing element having upwardly extending vertical side flanges and a horizontal surface to which said top flange is secured, and a lower channel shaped spacing element having downwardly extending vertical side flanges and a perforated horizontal surface to which said bottom flange is secured, said upper and lower elements extending lengthwise along and having ends projecting beyond the top and bottom edges respectively of the vane, a support member for said vanes comprising a perforated bottom plate underlying said row of vanes on which said vertical side flanges of said lower spacing elements rest, a pair of lower parallel upstanding edge guides extending along opposite side of the row of vanes in engagement with the projecting ends of said lower spacing elements, and an upper edge guide parallel to said pair of lower guides in engagement with a projecting end of each of said upper spacing elements, a liquid collecting channel underlying said plate including a sloped bottom wall, and a liquid discharge outlet in communication therewith, said vertical side flanges of said upper and lower spacing elements abutting the side flanges of adjacent spacing elements, said abutting side flanges and edge guides cooperating to maintain said vanes in spaced apart upstanding relationship, whereby said vertical surfaces abruptly change the direction of said fluid stream flowing between adjacent vanes to intercept impinging liquid contaminants of the stream, causing said contaminants to flow down said surfaces through the perforations in the lower spacing elements and the perforations in the bottom plate, along said sloped wall to said outlet, the channel shape of said lower spacing element obviating the need for registration of the perforations therein with the perforations in said bottom plate.

References Cited by the Examiner

UNITED STATES PATENTS

| | | | |
|---|---|---|---|
| 2,575,359 | 11/1951 | Ortgies | 55—223 |
| 2,649,924 | 8/1953 | McIlvaine et al. | 55—233 X |
| 2,691,423 | 10/1954 | McIlvaine | 55—249 |
| 2,703,629 | 3/1955 | Moerke | 55—257 X |
| 2,720,938 | 10/1955 | Cates | 55—444 |
| 2,752,005 | 6/1956 | Avera et al. | 55—440 |
| 2,818,938 | 1/1958 | Steel | 55—443 |
| 2,911,011 | 11/1959 | Niehart | 55—550 |
| 3,006,436 | 10/1961 | Starbuck et al. | 55—257 X |
| 3,063,220 | 11/1962 | Almquist | 55—229 X |

FOREIGN PATENTS

| | | |
|---|---|---|
| 257,368 | 3/1913 | Germany. |
| 304,026 | 3/1955 | Switzerland. |

HARRY B. THORNTON, *Primary Examiner.*

L. H. McCARTER, *Assistant Examiner.*